United States Patent
Sawada et al.

(10) Patent No.: US 8,988,851 B1
(45) Date of Patent: Mar. 24, 2015

(54) CAPACITOR INCLUDING FOUR TERMINAL ELECTRODES

(71) Applicant: Murata Manufacturing Co., Ltd., Nagaokakyo-shi, Kyoto-fu (JP)

(72) Inventors: Takashi Sawada, Nagaokakyo (JP); Shigekatsu Yamamoto, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 14/503,464

(22) Filed: Oct. 1, 2014

(30) Foreign Application Priority Data

Oct. 22, 2013 (JP) .................................. 2013-218818
Jul. 25, 2014 (JP) .................................. 2014-152001

(51) Int. Cl.
| | |
|---|---|
| *H01G 4/30* | (2006.01) |
| *H01G 4/12* | (2006.01) |
| *H01G 4/008* | (2006.01) |
| *H01G 4/248* | (2006.01) |
| *H01G 4/012* | (2006.01) |

(52) U.S. Cl.
CPC ............... *H01G 4/012* (2013.01); *H01G 4/30* (2013.01); *H01G 4/12* (2013.01); *H01G 4/008* (2013.01); *H01G 4/248* (2013.01)
USPC ...................................... 361/301.4

(58) Field of Classification Search
CPC ......... H01G 4/012; H01G 4/30; H01G 4/008; H01G 4/12; H01G 4/232
USPC ....................... 361/305, 306.3, 302
See application file for complete search history.

(56) References Cited

U.S. PATENT DOCUMENTS

| | | | | | |
|---|---|---|---|---|---|
| 5,712,758 | A | * | 1/1998 | Amano et al. | 361/321.2 |
| 6,124,769 | A | * | 9/2000 | Igarashi et al. | 333/172 |
| 7,510,673 | B2 | * | 3/2009 | Ohtani et al. | 252/512 |
| 7,558,047 | B2 | * | 7/2009 | Ukuma | 361/305 |
| 8,228,663 | B2 | * | 7/2012 | Takeuchi et al. | 361/306.3 |
| 2009/0034152 | A1 | * | 2/2009 | Aoki et al. | 361/301.4 |
| 2009/0290281 | A1 | * | 11/2009 | Nagamoto et al. | 361/305 |
| 2012/0154977 | A1 | * | 6/2012 | Hur et al. | 361/303 |
| 2012/0250218 | A1 | * | 10/2012 | Togashi et al. | 361/302 |
| 2013/0208401 | A1 | * | 8/2013 | Shirakawa et al. | 361/305 |

FOREIGN PATENT DOCUMENTS

| | | | | |
|---|---|---|---|---|
| JP | 59069907 | A | * | 4/1984 |
| JP | 04273418 | A | * | 9/1992 |
| JP | 09007878 | A | * | 1/1997 |
| JP | 2006186316 | A | * | 7/2006 |
| JP | 2009-218363 | A | | 9/2009 |

* cited by examiner

*Primary Examiner* — David M Sinclair
(74) *Attorney, Agent, or Firm* — Keating & Bennett, LLP

(57) ABSTRACT

A capacitor includes first and second grounding terminal electrodes each including first and second electrode layers. The first electrode layers are provided on third and fourth side surfaces. The second electrode layers are provided on the first electrode layers. The first and the second electrode layers each include Si and a conductive material. A ratio by weight of Si in the first electrode layer is higher than a ratio by weight of Si in the second electrode layer.

3 Claims, 6 Drawing Sheets

CAPACITOR INCLUDING FOUR TERMINAL ELECTRODES

BACKGROUND OF THE INVENTION

1. Field of the Invention

The present invention relates to a capacitor.

2. Description of the Related Art

A known multilayer capacitor includes signal terminal electrodes provided on first and second end surfaces of a capacitor main body, and grounding terminal electrodes provided on first and second side surfaces thereof (for example, see Japanese Unexamined Patent Application Publication No. 2009-218363).

In an electronic device, capacitors having different self-resonant frequencies are mounted in some cases. When two capacitors having different self-resonant frequencies are connected in parallel to each other, at an intermediate frequency between the self-resonant frequency of one capacitor and that of the other capacitor, a parallel resonance circuit is formed from an inductor and a capacitor. By this parallel resonance circuit, the antiresonance is generated. As a result, various problems, such as degradation in impedance characteristics at an antiresonant frequency and/or degradation in decoupling function at an antiresonant frequency, may arise.

SUMMARY OF THE INVENTION

According to a preferred embodiment of the present invention, a capacitor whose impedance characteristics at an antiresonant frequency are unlikely to be degraded even if electrically connected to a capacitor having a different self-resonant frequency is provided.

A capacitor according to a preferred embodiment of the present invention includes a capacitor main body including first and second primary surfaces extending in a first direction and a second direction perpendicular or substantially perpendicular to the first direction, first and second side surfaces extending in the first direction and a third direction perpendicular or substantially perpendicular to the first and the second directions, and third and fourth side surfaces extending in the second direction and third direction, first internal electrodes which are provided in the capacitor main body and which are extended to the first and second side surfaces, second internal electrodes which are provided in the capacitor main body to face the first internal electrodes in the third direction and which are extended to the third and fourth side surfaces, a first terminal electrode provided on the first side surface and electrically connected to the first internal electrodes, a second terminal electrode provided on the second side surface and electrically connected to the first internal electrodes, a third terminal electrode provided on the third side surface and electrically connected to the second internal electrodes, and a fourth terminal electrode provided on the fourth side surface and electrically connected to the second internal electrodes. The third terminal electrode includes a first electrode layer provided on the third side surface, and not provided on the first and the second primary surfaces, and a second electrode layer provided on the first electrode layer and provided on the first and the second primary surfaces. The fourth terminal electrode includes a third electrode layer provided on the fourth side surface, and not provided on the first and the second primary surfaces, and a fourth electrode layer provided on the third electrode layer and provided on the first and the second primary surfaces.

A capacitor according to another preferred embodiment of the present invention includes a capacitor main body including first and second primary surfaces extending in a first direction and a second direction perpendicular or substantially perpendicular to the first direction, first and second side surfaces extending in the first direction and a third direction perpendicular or substantially perpendicular to the first and the second directions, and third and fourth side surfaces extending in the second direction and third direction, first internal electrodes which are provided in the capacitor main body and which are extended to the first and the second side surfaces, second internal electrodes which are provided in the capacitor main body to face the first internal electrodes in the third direction and which are extended to the third and fourth side surfaces, a first terminal electrode provided on the first side surface and electrically connected to the first internal electrodes, a second terminal electrode provided on the second side surface and electrically connected to the first internal electrodes, a third terminal electrode provided on the third side surface and electrically connected to the second internal electrodes, and a fourth terminal electrode provided on the fourth side surface and electrically connected to the second internal electrodes. The third terminal electrode includes a first electrode layer provided on the third side surface, and a second electrode layer provided on the first electrode layer. The fourth terminal electrode includes a third electrode layer provided on the fourth side surface, and a fourth electrode layer provided on the third electrode layer. The first and third electrode layers include a conductive material including at least one metal selected from a group consisting of Ni, Cu, Ag, Pd, Au and Ag—Pd alloy, and an additive including Si, Ni, Ti, Ba and Zn. The second and fourth electrode layers include a conductive material including at least one metal selected from a group consisting of Ni, Cu, Ag, Pd, Au and Ag—Pd alloy, and an additive including Si, Ni, Ti, Ba and Zn. A ratio by weight of Si in the first electrode layers is greater than a ratio by weight of Si in the second electrode layers.

In the present application, the phrase "ratio by weight of Si" indicates a value obtained by dividing a content of Si by a sum of the content of Si and a content of a conductive material included in a layer, where the contents are measured in weight.

A capacitor according to another preferred embodiment of the present invention includes a capacitor main body including first and second primary surfaces extending in a first direction and a second direction perpendicular or substantially perpendicular to the first direction, first and second side surfaces extending in the first direction and a third direction perpendicular or substantially perpendicular to the first and the second directions, and a third and a fourth side surface extending in the second direction and third direction, first internal electrodes which are provided in the capacitor main body and which are extended to the first and the second side surfaces, second internal electrodes which are provided in the capacitor main body to face the first internal electrodes in the third direction and which are extended to the third and fourth side surfaces, a first terminal electrode provided on the first side surface and electrically connected to the first internal electrodes, a second terminal electrode provided on the second side surface and electrically connected to the first internal electrodes, a third terminal electrode provided on the third side surface and electrically connected to the second internal electrodes, and a fourth terminal electrode provided on the fourth side surface and electrically connected to the second internal electrodes. The third terminal electrode includes a first electrode layer provided on the third side surface, and a second electrode layer provided on the first electrode layer. The fourth terminal electrode includes a third electrode layer provided on the fourth side surface, and a fourth electrode layer provided on the third electrode layer. The first and third electrode layers include a conductive material including at least one metal selected from a group consisting of Ni, Cu, Ag, Pd, Au and Ag—Pd alloy, and an additive including Si, Ni, Ti, Ba and Zn. The second and fourth electrode layers include a conductive material including at least one metal selected from a group consisting of Ni, Cu, Ag, Pd, Au and Ag—Pd alloy, and an additive including Si, Ni, Ti, Ba and Zn. A ratio by weight of Ti and Ba in each of the second and fourth electrode layers is greater than a ratio by weight of Ti and Ba in each of the first and third layers.

In the present application, the phrase "ratio by weight of Ti and Ba" indicates a value obtained by dividing a content of Ti and Ba by a sum of the content of Ti and Ba and a content of a conductive material included in a layer, where the contents are measured in weight.

In the capacitor according to the above-described preferred embodiments, a ratio by weight of Si in each of the first and third electrode layers is preferably greater than a ratio by weight of Si in each of the second and fourth electrode layers.

In the capacitor according to the above-described preferred embodiments, a ratio by weight of Ti and Ba in each of the second and fourth electrode layers is preferably greater than a ratio by weight of Ti and Ba in each of the first and third electrode layers.

According to various preferred embodiments of the present invention, a capacitor whose impedance characteristics at an antiresonant frequency are unlikely to be degraded is provided even if being connected to a capacitor having a different self-resonant frequency.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figures 1, 2:
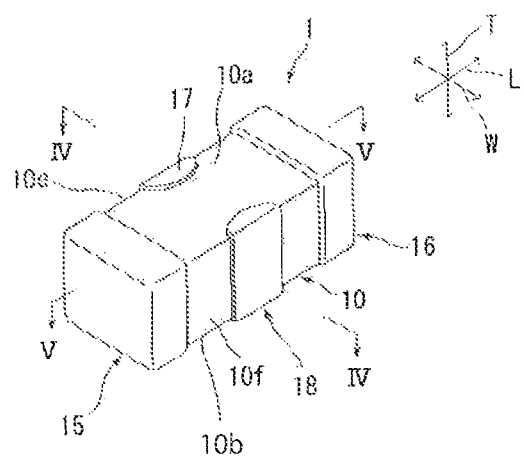
FIG. 1 is a schematic perspective view of a ceramic capacitor according to a preferred embodiment of the present invention.
FIG. 2 is a schematic plan view of the ceramic capacitor according to a preferred embodiment of the present invention.

Hereinafter, preferred embodiments of the present invention will be described by way of example. However, the following preferred embodiments will be simply described as examples, and the present invention is not limited thereto.

In addition, in the individual drawings to be referred in the preferred embodiments and the like, members having the same or substantially the same function are designated by the same reference numeral. In addition, the drawings to be referred in the preferred embodiments and the like are each schematically drawn. For example, the ratio in dimension of an object shown in the drawing may be different from that of an actual object in some cases. In addition, among the drawings, for example, the ratio in dimension of an object in one drawing may be different from that in another drawing in some cases. The ratio in dimension or the like of a concrete object is to be appropriately understood in consideration of the following description.

Figure 3:
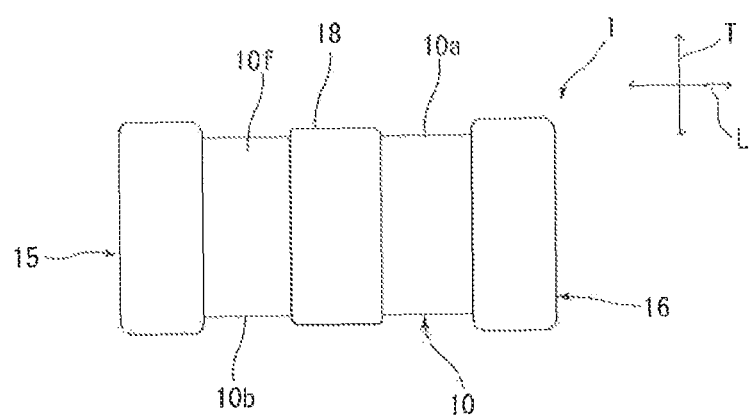
FIG. 3 is a schematic side view of the ceramic capacitor according to a preferred embodiment of the present invention.
Figure 4:
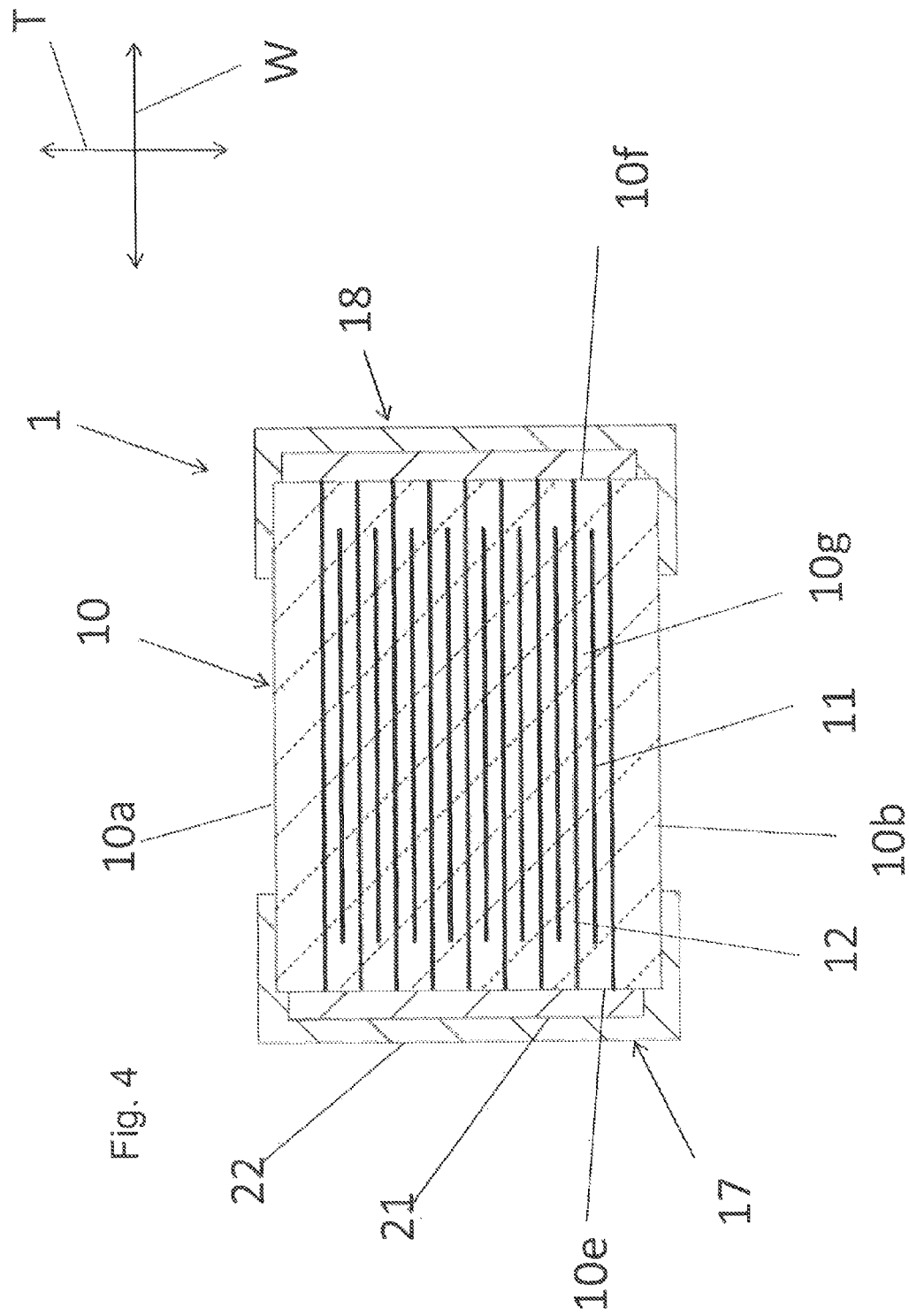
FIG. 4 is a schematic cross-section view taken along the line IV-IV in FIG. 1.
Figure 5:
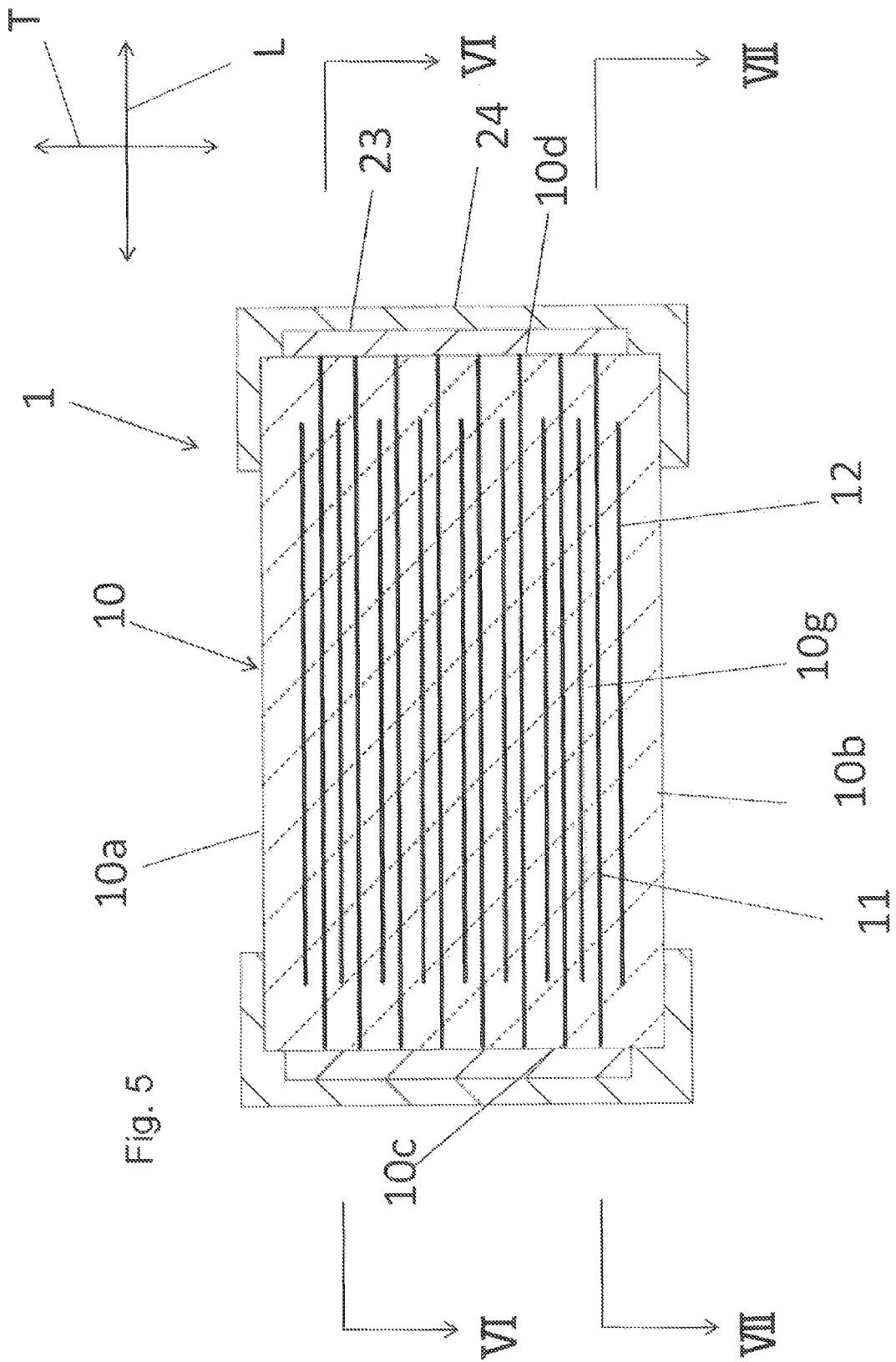
FIG. 5 is a schematic cross-section view taken along the line V-V in FIG. 1.
Figure 6:
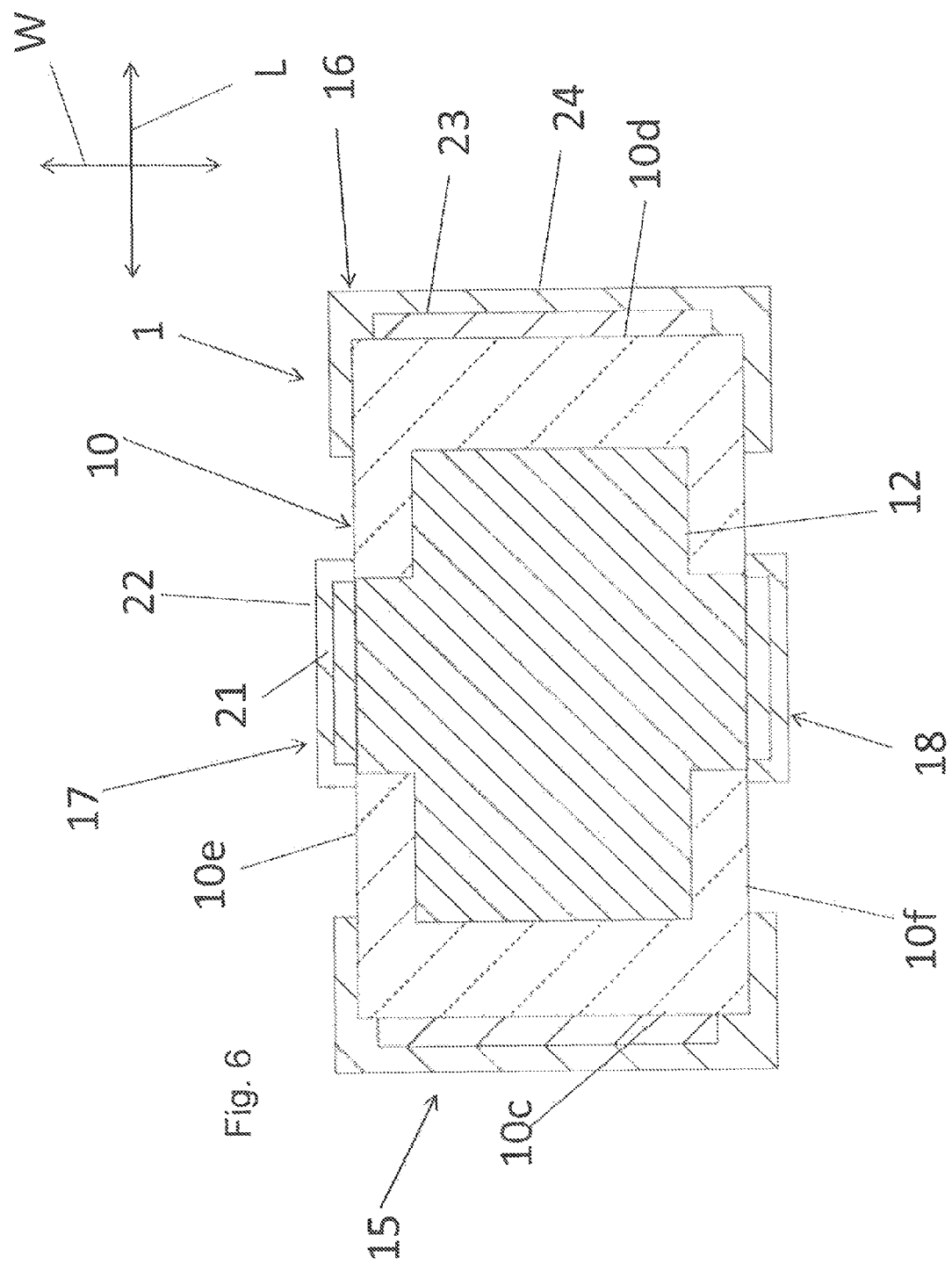
FIG. 6 is a schematic cross-section view taken along the line VI-VI in FIG. 5.
Figure 7:
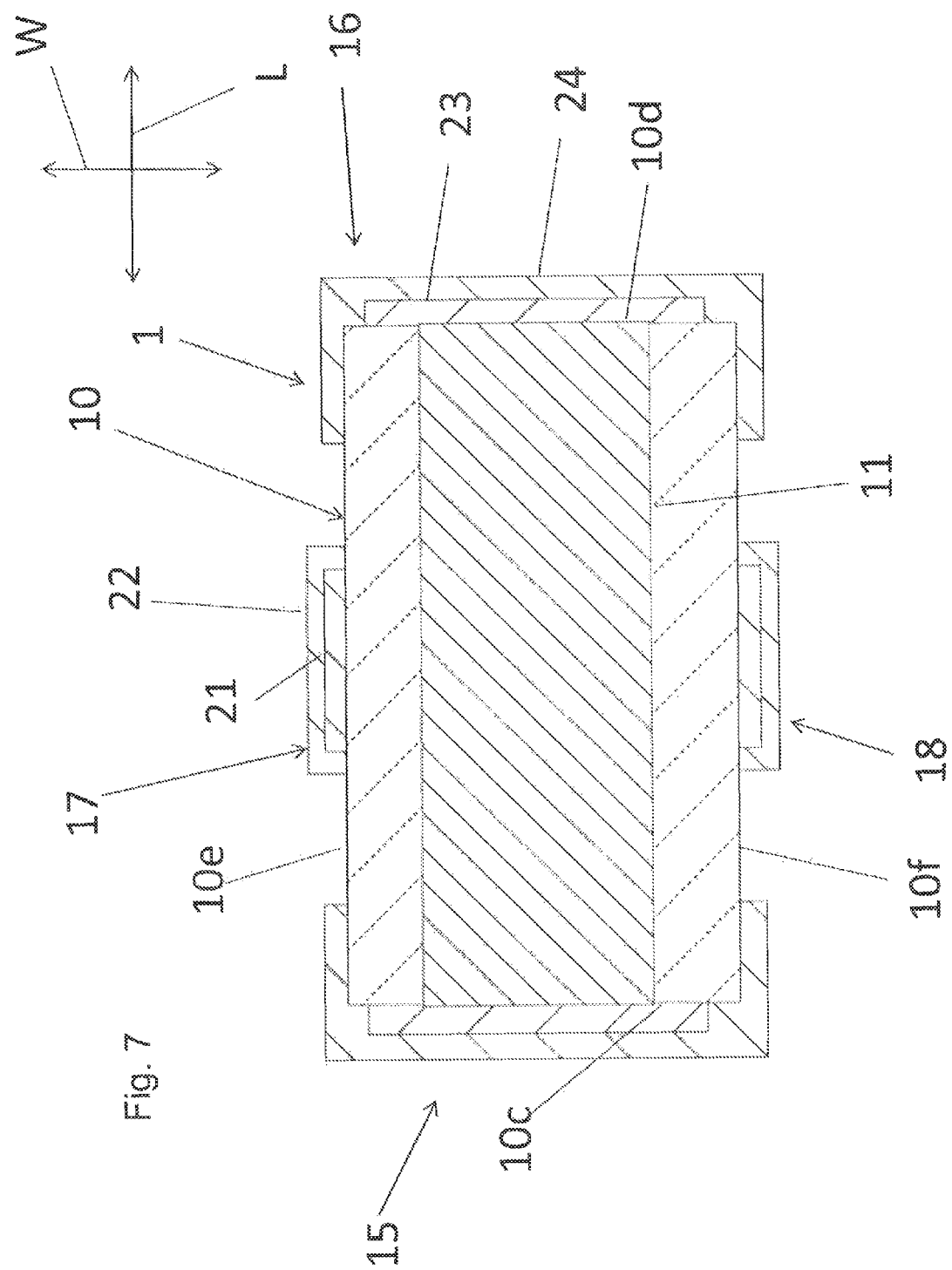
FIG. 7 is a schematic cross-section view taken along the line VII-VII in FIG. 5.

FIG. 1 is a schematic perspective view of a ceramic capacitor according to the present preferred embodiment. FIG. 2 is a schematic plan view of the ceramic capacitor according to the present preferred embodiment. FIG. 3 is a schematic side view of the ceramic capacitor according to the present preferred embodiment. FIG. 4 is a schematic cross-section view taken along the line IV-IV in FIG. 1. FIG. 5 is a schematic cross-section view taken along the line V-V in FIG. 1. FIG. 6 is a schematic cross-section view taken along the line VI-VI in FIG. 5. FIG. 7 is a schematic cross-section view taken along the line VII-VII in FIG. 5.

As shown in FIGS. 1 to 7, a ceramic capacitor 1 includes a capacitor main body 10. The capacitor main body 10 has a rectangular or substantially rectangular parallelepiped shape. Corner portions and ridge portions of the capacitor main body 10 may be chamfered or may be formed to have round shapes. In addition, the primary surfaces and the side surfaces may include irregularities.

The capacitor main body 10 includes a first and a second primary surface 10a and 10b, a first and a second side surface 10c and 10d, and a third and a fourth side surface 10e and 10f.

The first and the second primary surfaces 10a and 10b each extend in a width direction W which is a first direction and in a length direction L which is a second direction. The length direction L is perpendicular or substantially perpendicular to the width direction W. The first primary surface 10a and the second primary surface 10b face each other in a thickness direction T which is a third direction. The thickness direction T is perpendicular or substantially perpendicular to the length direction L and the width direction W.

In addition, in the present preferred embodiment, the case in which the first direction is the width direction W and the second direction is the length direction L will be described by way of example. However, the present invention is not limited to this configuration. For example, the first direction may be the length direction L, and the second direction may be the width direction W. That is, the longitudinal direction of the capacitor main body 10 may extend either in the first direction or the second direction.

The first and the second side surfaces 10c and 10d each extend in the width direction W which is the first direction and in the thickness direction T which is the third direction. The first side surface 10c and the second side surface 10d face each other in the length direction L.

The third and the fourth side surfaces 10e and 10f each extend in the length direction L which is the second direction and in the thickness direction T which is the third direction. The third side surface 10e and the fourth side surface 10f face each other in the width direction W.

The capacitor main body 10 may include, for example, a ceramic base body including a dielectric ceramic. Hereinafter, in this preferred embodiment, the case in which the capacitor main body 10 is preferably made of a dielectric ceramic will be described by way of example.

As particular non-limiting examples of the dielectric ceramic, for example, $BaTiO_3$, $CaTiO_3$, $SrTiO_3$, and $CaZrO_3$ may be mentioned. To the ceramic base body, for example, a Mn compound, a Mg compound, a Si compound, a Fe compound, a Cr compound, a Co compound, a Ni compound, and/or a rare earth compound may be added.

As shown in FIGS. 4 and 5, first internal electrodes 11 and second internal electrodes 12 are provided in the capacitor main body 10. The first internal electrodes 11 and the second internal electrodes 12 face each other in the thickness direction T with ceramic portions 10g interposed therebetween. In particular, in the capacitor main body 10, the first internal electrodes 11 and the second internal electrodes 12 are alternately disposed in the thickness direction T with the spaces interposed therebetween.

The first and the second internal electrodes 11 and 12 may be made of a metal, such as Ni, Cu, Ag, Pd, Au, or a Ag—Pd alloy, for example.

As shown in FIGS. 5 and 7, the first internal electrodes 11 are each arranged to extend to the first side surface 10c and the second side surface 10d. The first internal electrodes 11 are each electrically connected to a first signal terminal electrode 15 provided on the first side surface 10c and a second signal terminal electrode 16 provided on the second side surface 10d. As shown in FIG. 1, the first signal terminal electrode 15 is arranged over the first side surface 10c to extend onto the first and the second primary surfaces 10a and 10b and the third and the fourth side surfaces 10e and 10f. The second signal terminal electrode 16 is arranged over the second side surface 10d to extend onto the first and the second primary surfaces 10a and 10b and the third and the fourth side surfaces 10e and 10f.

As shown in FIGS. 4 and 6, the second internal electrodes 12 are each arranged to extend to the third side surface 10e and the fourth side surface 10f. The second internal electrodes 12 are each electrically connected to a first grounding terminal electrode 17 provided on the third side surface 10e and a second grounding terminal electrode 18 provided on the fourth side surface 10f. As shown in FIG. 1, the first grounding terminal electrode 17 is arranged on the third side surface 10e to extend onto the first and the second primary surfaces 10a and 10b. The second grounding terminal electrode 18 is arranged on the fourth side surface 10f to extend onto the first and the second primary surfaces 10a and 10b.

The first grounding terminal electrode 17 includes a first electrode layer 21 provided on the third side surface 10e and a second electrode layer 22 provided on the first electrode layer 21. As in the case described above, the second grounding terminal electrode 18 includes a first electrode layer 21 provided on the fourth side surface 10f and a second electrode layer 22 provided on the first electrode layer 21.

The first electrode layer 21 and the second electrode layer 22 each include a conductive material and an additive including a glass containing Si, Ti, Ba and Zn. In this preferred embodiment, in particular, the first and the second electrode layers 21 and 22 preferably are each a fired electrode layer formed preferably by firing a paste containing a conductive material and a glass powder containing Si, Ti, Ba and Zn. The conductive material may be formed, for example, from a metal, such as Ni, Cu, Ag, Pd, Au, or a Ag—Pd alloy.

The first and the second grounding terminal electrodes 17 and 18 each may further include an electrode layer other than the first and the second electrode layers 21 and 22. The first and the second grounding terminal electrodes 17 and 18 each may further include, for example, at least one plating film provided on the second electrode layer 22.

The first signal terminal electrode 15 includes a third electrode layer 23 provided on the first side surface 10c and a fourth electrode layer 24 provided on the third electrode layer 23. As in the case described above, the second signal terminal electrode 16 includes a third electrode layer 23 provided on the second side surface 10d and a fourth electrode layer 24 provided on the third electrode layer 23.

The third electrode layer 23 and the fourth electrode layer 24 each include a conductive material and an additive including a glass containing Si, Ti, Ba and Zn. In this preferred embodiment, in particular, the third and the fourth electrode layers 23 and 24 preferably are each a fired electrode layer formed preferably by firing a paste containing a conductive material and a glass powder containing Si, Ti, Ba and Zn. The conductive material may be formed, for example, from a metal, such as Ni, Cu, Ag, Pd, Au, or a Ag—Pd alloy.

The first and the second signal terminal electrodes 15 and 16 each may further include an electrode layer other than the third and the fourth electrode layers 23 and 24. The first and the second signal terminal electrodes 15 and 16 each may further include, for example, at least one plating film provided on the fourth electrode layer 24.

In the ceramic capacitor 1, a ratio by weight of Si in the first electrode layer 21 is higher than that in the second electrode layer 22. As described above, when the first electrode layer 21 having a high ratio by weight of Si and a high electrical resistance is provided as part of each of the first and the second grounding terminal electrodes 17 and 18, the electrical resistance of each of the first and the second grounding terminal electrodes 17 and 18 is increased. Hence, even when the ceramic capacitor 1 is connected in parallel to a capacitor having a different self-resonant frequency, the impedance characteristics at an antiresonant frequency are unlikely to be degraded, and in addition, the decoupling function is also unlikely to be degraded in the vicinity of the antiresonant frequency.

The ratio by weight of Si of the first and the second grounding terminal electrodes 17 and 18 may be measured by the following method. First, grinding is performed from the first side surface 10c or the second side surface 10d of the ceramic capacitor 1 to the centers of the first grounding terminal electrode and the second grounding terminal electrode, so that the cross sections of the first grounding terminal electrode and the second grounding terminal electrode are exposed. The content of Si and that of the conductive material (such as Cu) are quantitatively determined by a wavelength-dispersive X-ray (WDX) spectroscopy at a viewing angle of about 80 μm by about 80 μm, for example. In addition, the value obtained by dividing the content of Si by the sum of the content of Si and the content of the conductive material is calculated as the ratio by weight of Si.

In addition, since the first electrode layer 21 having a high ratio by weight of Si is provided on the capacitor main body 10, moisture is prevented from entering the capacitor main body 10. Hence, excellent moisture resistance is realized. On the other hand, since the second electrode layer 22 located on the first electrode layer 21 has a relatively low ratio by weight of Si, for example, a plating film is likely to be formed on the second electrode layer 22, and in addition, the adhesion strength between the plating film and the second electrode layer 22 is increased. The ratio by weight of Si of the first electrode layer 21 is preferably about 1.5 times to about 2 times that of the second electrode layer 22.

As is the case described above, the first and the second signal terminal electrodes 15 and 16 are provided on the capacitor main body 10 and each include a third electrode layer 23 having a relatively high ratio by weight of Siz and a fourth electrode layer 24 which is provided thereon and which has a relatively low ratio by weight of Si. Hence, excellent moisture resistance is secured, a plating film is likely to be formed on the fourth electrode layer 24, and in addition, the adhesion strength between the plating film and the fourth electrode layer is increased. The ratio by weight of Si of the third electrode layer 23 is preferably about 1.5 times to about 2 times that of the fourth electrode layer 24.

The ratio by weight of Si of the first and the second signal terminal electrodes 15 and 16 may be measured by the following method. First, grinding is performed from the third side surface 10e or the fourth side surface 10f of the ceramic capacitor 1 to the centers of the first signal terminal electrode and the second signal terminal electrode, so that the cross sections of the first signal terminal electrode and the second signal terminal electrode are exposed. Subsequently, the content of Si and that of the conductive material (such as Cu) are quantitatively determined by a wavelength-dispersive X-ray (WDX) spectroscopy at a viewing angle of about 80 μm by about 80 μm, for example. In addition, the value obtained by dividing the content of Si by the sum of the content of Si and the content of the conductive material is calculated as the ratio by weight of Si.

In addition, since signals are sent to the first and the second signal terminal electrodes 15 and 16, the electrical resistance of each of the first and the second signal terminal electrodes 15 and 16 is preferably lower than that of each of the first and the second grounding terminal electrodes 17 and 18. Hence, the thickness of the first electrode layer 21 is preferably larger than that of the third electrode layer 23, more preferably approximately 1.5 times or more the thickness of the third electrode layer 23, and even more preferably approximately 1.8 times or more, for example. However, when the thickness of the first electrode layer 21 is excessively larger than that of the third electrode layer 23, the electrical resistance of each of the first and the second grounding terminal electrodes 17 and 18 may be excessively increased in some cases. Hence, the thickness of the first electrode layer 21 is preferably approximately 2 times or less the thickness of the third electrode layer 23, for example.

In addition, the thickness of the first electrode layer 21 and that of the third electrode layer 23 can be measured by the following method. After polishing sags generated by polishing on the cross sections of the first and the second grounding terminal electrodes and the first and the second signal terminal electrodes, which are exposed in the Si ratio by weight measurement, are removed, the thickness of the first electrode layer 21 and that of the third electrode layer 23, each of which is projected to a SEM, can be measured.

A method for manufacturing the ceramic capacitor 1 is not particularly limited. The ceramic capacitor 1 may be manufactured, for example, by the following procedure.

First, ceramic green sheets each containing a ceramic powder are prepared. The ceramic green sheets each may be formed, for example, by printing a ceramic paste containing a ceramic powder or the like.

Next, a conductive paste is applied on the ceramic green sheets, so that conductive paste layers forming the first and the second internal electrodes 11 and 12 are formed. The application of the conductive paste may be performed by various printing methods, such as a screen printing method.

Subsequently, after ceramic green sheets on which no conductive paste layers are printed are laminated so as to have a total thickness of about 20 μm to about 30 μm, ceramic green sheets, each of which has a thickness of about 0.7 μm to about 1.2 μm and is provided with a conductive paste layer having a shape corresponding to the first internal electrode 11, and ceramic green sheets, each of which has a thickness of about 0.7 to about 1.2 μm and is provided with a conductive paste layer having a shape corresponding to the second internal electrode 12, are alternately laminated so that the total number of the ceramic green sheets is approximately 230 to 240, for example. Next, ceramic green sheets on which no conductive paste layers are printed are laminated on the above ceramic green-sheet laminate so as to have a total thickness of about 20 μm to about 30 μm. Subsequently, the laminate thus obtained is pressed in the thickness direction, so that a mother laminate is formed.

Next, the mother laminate is cut along imaginary cut lines, so that a plurality of green ceramic laminates are formed from the mother laminate. Incidentally, cutting of the mother laminate may be performed by dicing or pressure cutting.

After the green ceramic laminates are formed, by barrel polishing or the like, chamfering or R-chamfering of ridge portions of the green ceramic laminates and polishing of the surface layers thereof may be performed.

Next, firing of the green ceramic laminates is performed to form ceramic laminates. A firing temperature may be appropriately determined in accordance with the type of ceramic material and the type of conductive paste to be used.

Next, on each of the ceramic laminates thus formed, a conductive paste containing a glass powder and a conductive material is applied, so that first conductive paste layers forming the first and the third electrode layers 21 and 23 are formed. A first conductive paste layer forming the first electrode layer 21 is preferably formed thicker than that of the other first conductive paste layer forming the third electrode layer 23.

Furthermore, on the first conductive paste layers, a conductive paste having a lower ratio by weight of a glass powder than that of the conductive paste forming the first conductive paste layer is applied, so that second conductive paste layers forming the second and the fourth electrode layers 22 and 24 are formed.

Next, the first and the second conductive paste layers are fired.

In the final step, a Ni plating layer and a Sn plating layer are sequentially formed in this order on the second and the fourth electrode layers 22 and 24, so that the first and the second signal terminal electrodes 15 and 16 and the first and the second grounding terminal electrodes 17 and 18 are formed. By the steps described above, the ceramic capacitor 1 is obtained.

In this preferred embodiment, the structure in which the first signal terminal electrode defines a first terminal electrode, the second signal terminal electrode defines a second terminal electrode, the first grounding terminal electrode defines a third terminal electrode, and the second grounding terminal electrode defines a fourth terminal electrode is described above by way of example. However, the present invention is not limited to the structure described above. For example, the structure in which the first and the second grounding terminal electrodes define the first and the second terminal electrodes, and the first and the second signal terminal electrodes define the third and the fourth terminal electrodes may also be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A capacitor comprising:
    a capacitor main body including first and second primary surfaces extending in a first direction and a second direction perpendicular or substantially perpendicular to the first direction, first and second side surfaces extending in the first direction and a third direction perpendicular or substantially perpendicular to the first and the second directions, and a third and a fourth side surface extending in the second direction and third direction;

first internal electrodes which are provided in the capacitor main body and which are extended to the first and the second side surfaces;

second internal electrodes which are provided in the capacitor main body to face the first internal electrodes in the third direction and which are extended to the third and fourth side surfaces;

a first terminal electrode provided on the first side surface and electrically connected to the first internal electrodes;

a second terminal electrode provided on the second side surface and electrically connected to the first internal electrodes;

a third terminal electrode provided on the third side surface and electrically connected to the second internal electrodes; and a fourth terminal electrode provided on the fourth side surface and electrically connected to the second internal electrodes; wherein the third terminal electrode includes:
    a first electrode layer provided on the third side surface; and
    a second electrode layer provided on the first electrode layer;

the fourth terminal electrode includes:
    a third electrode layer provided on the fourth side surface; and
    a fourth electrode layer provided on the third electrode layer;

the first and third electrode layers include:
    a conductive material including at least one metal selected from a group consisting of Ni, Cu, Ag, Pd, Au and Ag—Pd alloy; and
    an additive including Si, Ni, Ti, Ba and Zn, the second and fourth electrode layers include:
    a conductive material including at least one metal selected from a group consisting of Ni, Cu, Ag, Pd, Au and Ag—Pd alloy; and
    an additive including Si, Ni, Ti, Ba and Zn; wherein a ratio by weight of Ti and Ba in each of the second and fourth electrode layers is greater than a ratio by weight of Ti and Ba in each of the first and third layers.

2. A capacitor comprising:

a capacitor main body including first and second primary surfaces extending in a first direction and a second direction perpendicular or substantially perpendicular to the first direction, first and second side surfaces extending in the first direction and a third direction perpendicular or substantially perpendicular to the first and the second directions, and third and fourth side surfaces extending in the second direction and third direction;

first internal electrodes which are provided in the capacitor main body and which are extended to the first and the second side surfaces;

second internal electrodes which are provided in the capacitor main body to face the first internal electrodes in the third direction and which are extended to the third and fourth side surfaces;

a first terminal electrode provided on the first side surface and electrically connected to the first internal electrodes;

a second terminal electrode provided on the second side surface and electrically connected to the first internal electrodes;

a third terminal electrode provided on the third side surface and electrically connected to the second internal electrodes; and a fourth terminal electrode provided on the fourth side surface and electrically connected to the second internal electrodes; wherein the third terminal electrode includes:
    a first electrode layer provided on the third side surface; and
    a second electrode layer provided on the first electrode layer;

the fourth terminal electrode includes:
    a third electrode layer provided on the fourth side surface; and
    a fourth electrode layer provided on the third electrode layer;

the first and third electrode layers include:
    a conductive material including at least one metal selected from a group consisting of Ni, Cu, Ag, Pd, Au and Ag—Pd alloy; and
    an additive including Si, Ni, Ti, Ba and Zn, the second and fourth electrode layers include:
    a conductive material including at least one metal selected from a group consisting of Ni, Cu, Ag, Pd, Au and Ag—Pd alloy; and
    an additive including Si, Ni, Ti, Ba and Zn; wherein a ratio by weight of Si in the first electrode layers is greater than a ratio by weight of Si in the second electrode layers; and a ratio by weight of Ti and Ba in each of the second and fourth electrode layers is greater than a ratio by weight of Ti and Ba in each of the first and third electrode layers.

3. A capacitor comprising:

a capacitor main body including first and second primary surfaces extending in a first direction and a second direction perpendicular or substantially perpendicular to the first direction, first and second side surfaces extending in the first direction and a third direction perpendicular or substantially perpendicular to the first and the second directions, and third and fourth side surfaces extending in the second direction and third direction;

first internal electrodes which are provided in the capacitor main body and which are extended to the first and second side surfaces;

second internal electrodes which are provided in the capacitor main body to face the first internal electrodes in the third direction and which are extended to the third and fourth side surfaces;

a first terminal electrode provided on the first side surface and electrically connected to the first internal electrodes;

a second terminal electrode provided on the second side surface and electrically connected to the first internal electrodes;

a third terminal electrode provided on the third side surface and electrically connected to the second internal electrodes; and a fourth terminal electrode provided on the fourth side surface and electrically connected to the second internal electrodes; wherein the third terminal electrode includes:
    a first electrode layer provided on the third side surface, and not provided on the first and the second primary surfaces; and
    a second electrode layer provided on the first electrode layer and provided on the first and the second primary surfaces;

the fourth terminal electrode includes:
    a third electrode layer provided on the fourth side surface, and not provided on the first and the second primary surfaces; and a fourth electrode layer provided on the third electrode layer and provided on the first and the second primary surfaces;

a ratio by weight of Si in each of the first and third electrode layers is greater than a ratio by weight of Si in each of the second and fourth electrode layers; and a ratio by weight of Ti and Ba in each of the second and fourth electrode layers is greater than a ratio by weight of Ti and Ba in each of the first and third electrode layers.

* * * * *